United States Patent [19]
Buxbaum

[11] Patent Number: 5,888,273
[45] Date of Patent: Mar. 30, 1999

[54] HIGH TEMPERATURE GAS PURIFICATION SYSTEM

[76] Inventor: Robert E. Buxbaum, 25451 Gardner Pl., Oak Park, Mich. 48237

[21] Appl. No.: 936,665

[22] Filed: Sep. 24, 1997

Related U.S. Application Data

[60] Provisional application No. 60/026,918 Sep. 25, 1996.
[51] Int. Cl.$^6$ .......................... B01D 53/22; B01D 63/06
[52] U.S. Cl. .......................... 95/56; 95/45; 95/55; 96/10; 96/11
[58] Field of Search .................. 95/55, 56, 45, 95/47–54; 96/4, 7–11

[56] References Cited

U.S. PATENT DOCUMENTS

| | | | |
|---|---|---|---|
| 2,609,059 | 9/1952 | Benedict | 95/55 |
| 3,210,162 | 10/1965 | Rudd | 96/7 X |
| 3,338,681 | 8/1967 | Kordesch | 96/8 X |
| 3,350,176 | 10/1967 | Green et al. | 96/10 X |
| 3,368,329 | 2/1968 | Euguchi et al. | 96/8 |
| 3,665,680 | 5/1972 | Heuser | 96/10 |
| 3,761,382 | 9/1973 | Hammond et al. | 96/10 X |
| 3,782,904 | 1/1974 | Fletcher | 96/10 X |
| 3,972,695 | 8/1976 | Buckley et al. | 96/10 |
| 4,003,725 | 1/1977 | Bunn, Jr. et al. | 96/8 |
| 4,468,235 | 8/1984 | Hill | 95/56 X |
| 4,472,176 | 9/1984 | Rubin | 95/56 |
| 4,781,241 | 11/1988 | Missage et al. | 165/1 |
| 4,810,485 | 3/1989 | Marianowski et al. | 95/56 X |
| 4,849,187 | 7/1989 | Uozu et al. | 422/197 |
| 4,849,189 | 7/1989 | Jansz | 423/64 |
| 4,901,790 | 2/1990 | Meijer | 96/10 |
| 4,904,455 | 2/1990 | Karafian | 422/210 |
| 4,981,676 | 1/1991 | Minet et al. | 95/55 X |
| 5,205,841 | 4/1993 | Vaiman | 95/56 X |
| 5,226,928 | 7/1993 | Makabe et al. | 48/94 |
| 5,382,271 | 1/1995 | Ng et al. | 48/61 |
| 5,449,848 | 9/1995 | Itoh | 95/56 X |
| 5,458,857 | 10/1995 | Collins et al. | 422/198 |
| 5,510,559 | 4/1996 | Barger et al. | 585/664 |
| 5,516,344 | 5/1996 | Corrigan | 48/127.9 |
| 5,639,431 | 6/1997 | Shirasaki et al. | 422/212 |

FOREIGN PATENT DOCUMENTS

| | | | |
|---|---|---|---|
| 45-014404 | 5/1970 | Japan | 95/56 |
| 45-002642 | 9/1970 | Japan | 95/56 |
| 01-145302 | 6/1989 | Japan | 95/56 |
| 01-145303 | 6/1989 | Japan | 95/56 |
| 06-134244 | 5/1994 | Japan | 96/8 |
| 0573444 | 10/1977 | U.S.S.R. | 96/8 |

OTHER PUBLICATIONS

Buxbaum, Robert E. & Kinney, Andrew B., "Hydrogen Transport through Tubular Membranes of Palladium–Coated Tantalum and Niobium," Industrial & Engineering Chemistry Research, vol. 35, No. 2, pp. 530–537 (1996).

*Primary Examiner*—Robert Spitzer
*Attorney, Agent, or Firm*—Gifford, Krass, Groh, Sprinkle, Anderson & Citkowski, P.C.

[57] ABSTRACT

A high temperature membrane reactor or gas purification apparatus includes a housing containing a gas heating chamber and a gas extraction component, preferably one or more tubular membranes. The preferred application is for extracting hydrogen from a mixed gas flow or for generating hydrogen, e.g., by reforming methanol, ethanol, or gasoline. A surrounding annulus provides heat exchange and insulation by circulating the mixed gas flow about the housing and then injecting the mixed gas flow into the housing for extraction or reaction. The apparatus further includes an outlet for releasing raffinate preferably including a flow controlling restriction. Heating is provided by conducting the raffinate from the gas extraction component to the heating chamber wherein reaction with a catalyst generates heat. These features, alone or in combination, provide better energy management, better flow management, and better safety than current designs. A spring-type support for the membrane is further described which increases the maximum useable operation pressure of the membranes to take better advantage of the membrane reactor and gas purification features.

28 Claims, 3 Drawing Sheets

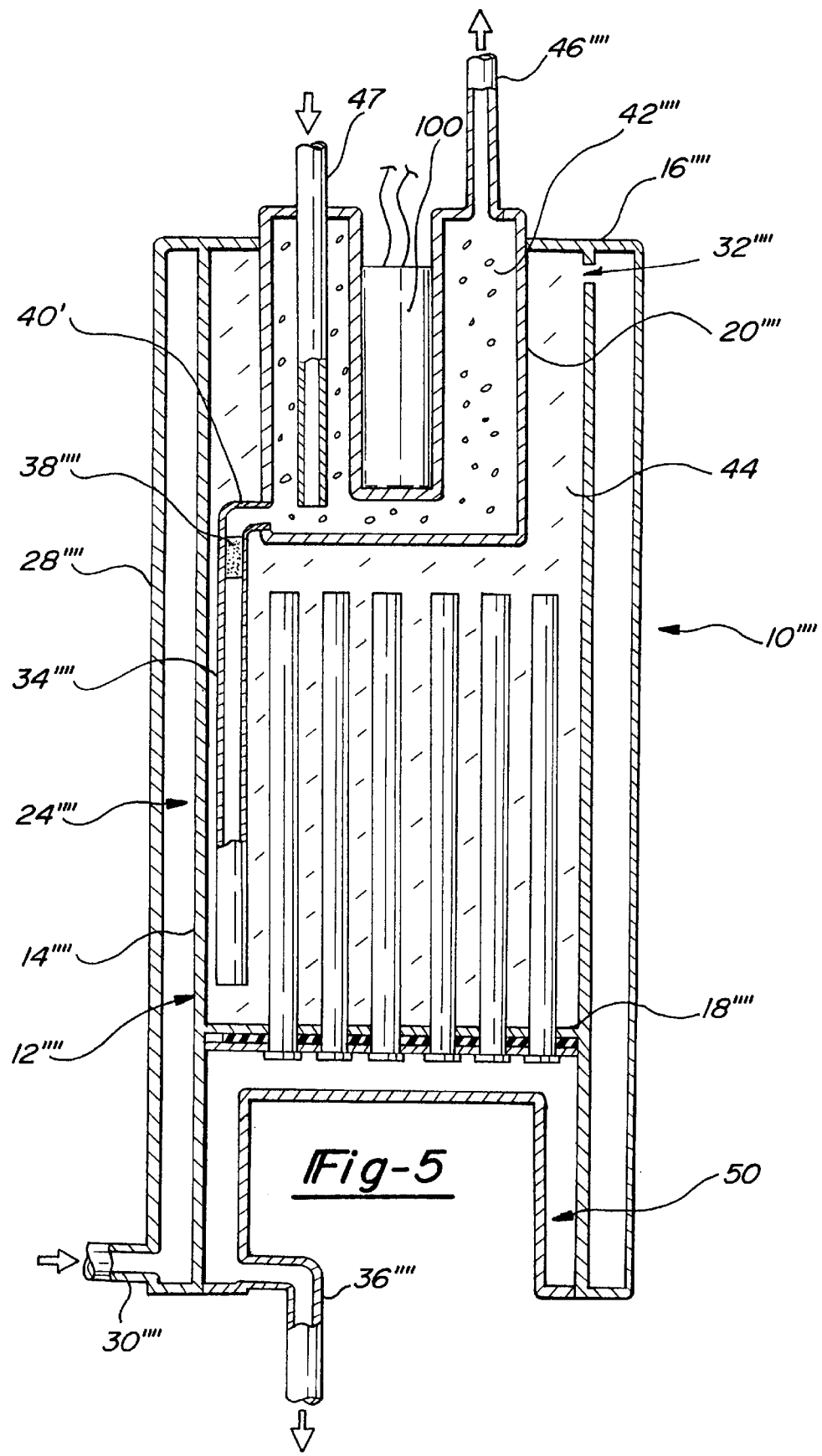

5,888,273

HIGH TEMPERATURE GAS PURIFICATION SYSTEM

This application claims priority for continuing data as claimed by Applicant—Provisional Application No. 60/026,918 filed Sept. 25, 1996.

TECHNICAL FIELD

The present invention relates to an apparatus for the purification of a constituent gas and also to the generation of a constituent gas and the subsequent separation and purification from a mixed gas flow. More specifically, the present invention relates to the generation or purification of hydrogen from a mixture containing hydrogen. The apparatus utilizes one or more gas extraction membrane for removing hydrogen or other extractable gas from a mixed gas flow.

BACKGROUND OF THE INVENTION

The common technology for extracting gases such as hydrogen from industrial streams, for use in the electronics industry for hydrogenation or for changing the balance of hydrogen in those streams is to use membranes. The membranes are disposed in a housing. A mixed gas flow is conducted to the housing wherein the extraction occurs. Extracted gas (such as hydrogen) is preferentially extracted through the membranes and exits through an outlet port. A second outlet allows for the exhaust of raffinate out of the chamber, Examples of such chambers are shown in U.S. Pat. Nos. 5,205,841, and 4,468,235.

Many protocols require the mixed gas to be at elevated temperatures. In such cases, heat is lost from the housing, through the housing walls or carried away with the extracted gas, thereby resulting in loss of thermal efficiency of this system. Furthermore, heating methods currently in use tend to produce large thermal gradients, with the gas extraction membrane often being heated excessively in some areas and being under heated in others. The result of this is decreased flow rates and/or damage to the membranes. Johnson Matthey, LTD, has used a system of multiple heaters and temperature controllers, but this approach is energy inefficient and does not control the temperature much better than the single heater as the multiple controllers often fight one another. A system that helps to conserve heat and avoid these problems is disclosed in the pending U.S. application Ser. No. 08/875,046, published as WO 97/17125 to the inventor of the present invention.

Raffinate flow control and safety are also problems with the currently available purification and generation systems. The inventor has observed an input gas explosion during hot start up. Similarly, explosive conditions can result from a cool down in air where the module, full of combustible gas, sucks air in through the raffinate port. In either case, an explosive mixture of air and gas mixture suddenly contacts a hot membrane and thus creates a serious danger. This danger is all the more severe as if the present invention is used as a hydrogen generator to fuel a fuel cell, e.g., to run a car, because of the demanding operating environment and the variety of mechanical talent, and the desire for a unit can be turned on or off instantly.

Pure gas suck-back can also ruin a membrane if the sucked-back gas has already been mixed with a component, like arsine, that can poison the membrane. Purified hydrogen is mixed with arsine in the manufacture of semiconductors.

SUMMARY OF THE INVENTION

In accordance with the present invention, there is provided a high temperature gas purification system including a housing, a gas heating means for heating a mixed gas flow within the housing and a gas extraction means for selectively passing therethrough a constituent gas from the mixed gas flow. An annulus surrounds the housing for insulating the housing by circulating the incoming mixed gas flow about the housing and then injecting the mixed gas flow into the housing for extraction by the gas extraction means. A second annulus is optionally provided to enhance the transfer of heat from the extracted gas to the incoming mixture.

The heating means includes a heating chamber disposed within the housing and in thermal contact with the gas extraction means. Alternatively, the heat is applied from outside of the annulus. The heat can be electrical, or steam, and includes the possibility of providing a fluid conduit for conducting raffinate from the gas extraction means to the heating chamber. In this case, the heating chamber contains a catalyst for reacting the raffinate (e.g., with air) to generate heat within the heating chamber. This set-up is particularly useful if the invention is used as a hydrogen generator, e.g., as a methanol or ethanol reformer, when combined with a suitable catalyst within the housing.

The housing includes an outlet for releasing raffinate mixed gas flow therethrough and flow restricting means of controlling raffinate movement out of the housing.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross sectional view of a fifth embodiment of the present invention suited for generating hydrogen from methanol and water.

DETAILED DESCRIPTION OF THE DRAWINGS

Figure 1:
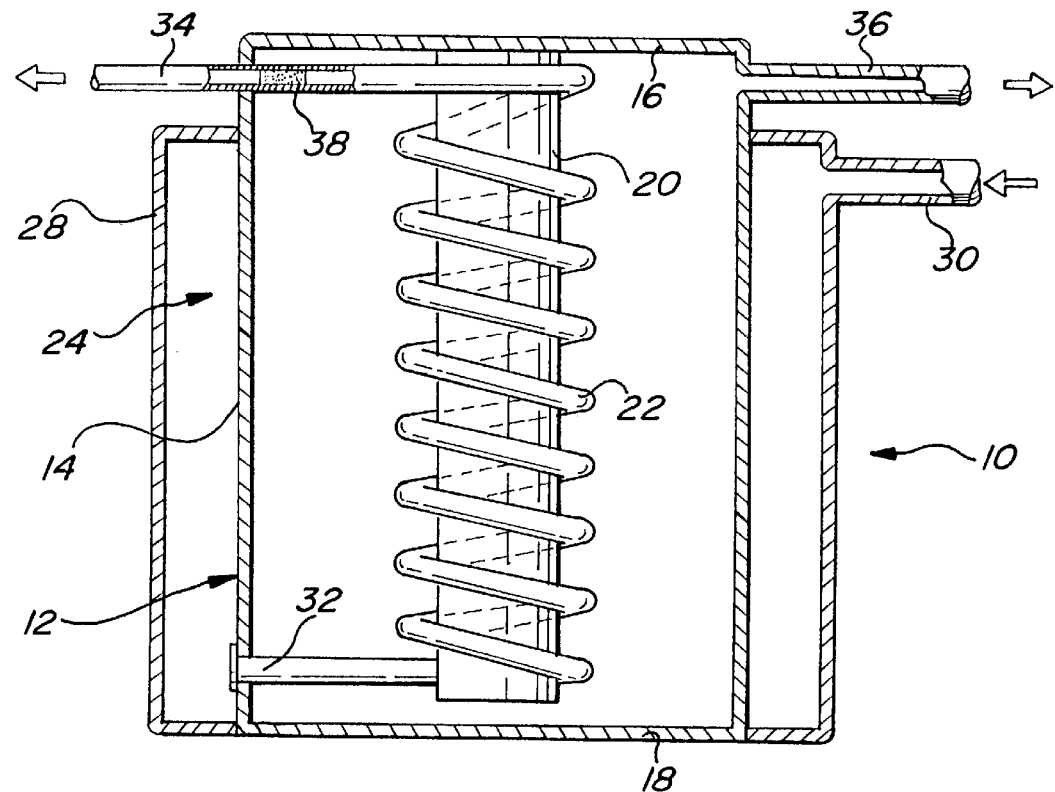
FIG. 1 is a cross sectional view of a gas purification system constructed in accordance with the present invention.
Figure 2:
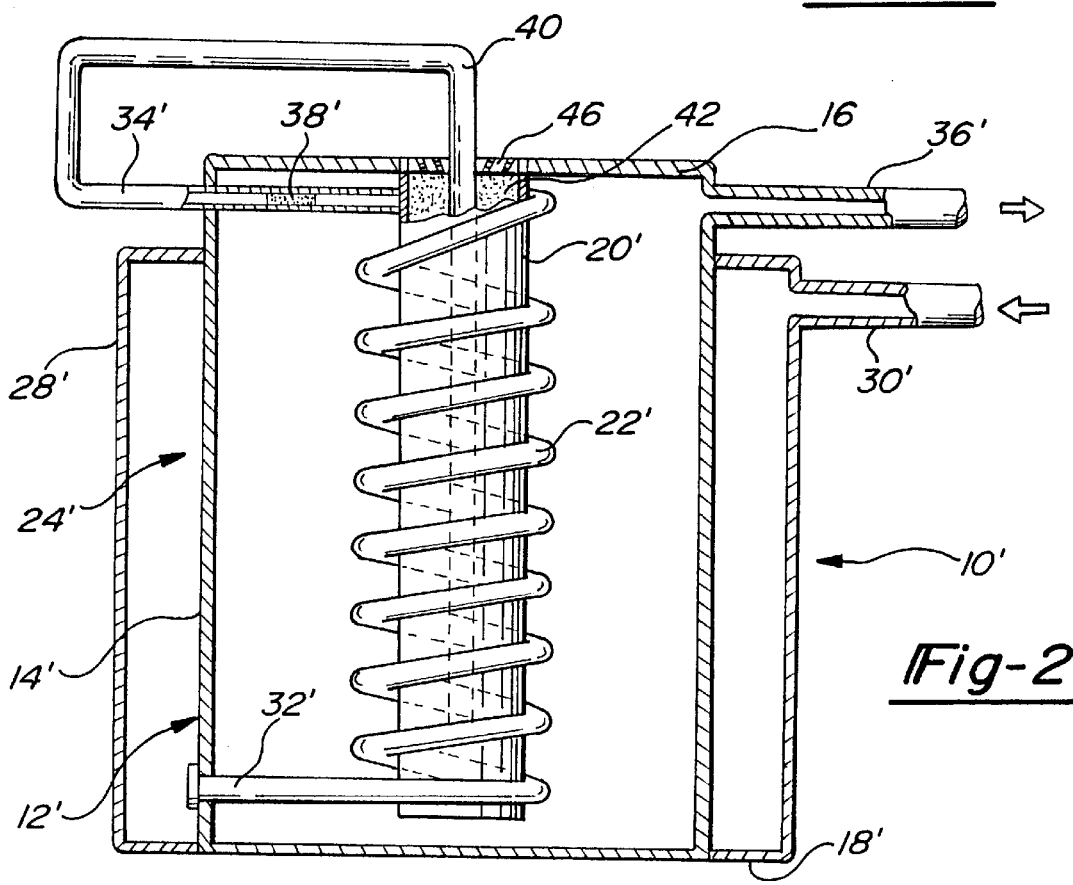
FIG. 2 is a cross sectional view of a gas purification system further including a conduit for recirculating raffinate air into the heating chamber of the system.

An apparatus for extracting a gas, preferably hydrogen, from a mixed gas flow containing a constituent gas to be separated is generally shown at 10 in FIG. 1. FIG. 2 shows a variant of the invention wherein like parts are shown by primed-like numbers. Extraction of a constituent gas from a mixed gas flow using the instant invention is typically facilitated by elevated temperatures. Temperatures in the range of between about 70° C. and 700° C. are useful in promoting increased diffusion rates and catalyst activity. With the use of elevated temperature systems, heat management becomes an important factor in the efficient operation of the gas purification system of the instant invention.

The operation of an apparatus of the instant invention at an elevated temperature poses minimal safety hazards under start-up or shut-down conditions owing to operation of a flow restricting means to lessen the seepage of atmospheric air into the apparatus. Without the innovation of the instant invention, during start-up, the presence of air in contact with gases, such as hydrogen at increasing temperatures as the apparatus reaches steady state operating temperature and pressure is an explosion hazard. A similar, hazard exists upon shut-down. In the instant invention a flow restricting means restricts the back flow of external gas, such as atmospheric air from entering the apparatus and only allows the unidirectional movement of gas out of the apparatus. The flow restricting means illustratively includes a frit, a plenum or check valve. Preferably, a frit or check valve is adapted as a flow restricting means. With the frit or check valve closing in response to a pressure within the apparatus decreasing below a pre-selected threshold.

Generally, a gas purification system 10 of the present invention includes a housing shown generally at 12, the housing having a substantially annular side wall 14 and top and bottom walls 16 and 18, respectively. The shape of the housing 12 is not critical with regard to the various aspects of the present invention.

The housing 12 includes a gas heating means in the form of a heating chamber 20 which is shown in FIG. 1. Heating means are well known in the art and illustratively include, electrical heating, such as an electrical cartridge heater or a combustion source which are readily disposed within the chamber 20 to heat a mixed gas flow within the housing 12. Alternatively, a furnace or heating tape is provided surrounding the apparatus 10.

Preferably, the housing is 1.0 to 4 inches in diameter. The heating chamber 20 is approximately 0.25 to 3.0 inch in diameter. It is appreciated that these dimensions and the ratio therebetween are readily modified to accommodate different throughput requirements and heat management efficiencies of scale.

The assembly 10 includes a gas extraction means for making an extraction from the mixed gas flow. The system employs a single coiled membrane 22 or 22', multiple coiled membranes, 22", or multiple straight membranes 22''' or 22'''' Representative membrane designs of the instant invention are shown in FIGS. 1 through 5. For hydrogen extraction, the membranes of the instant invention preferably consist of a hydrogen extractable material selected from: palladium-coated refractory metals, or alloys of refractory metals, polymers, palladium-silver, palladium-copper, porous metals, silica, and ceramics. The tubes generally have a diameter of 0.020 to 0.25 inches.

An insulating gas annulus 24 surrounds the housing 12 in order to insulate the housing 12. This is accomplished by the annulus 24 circulating the mixed gas flow about the housing 12 and then injecting the mixed gas flow into the housing 12 for extraction by the gas extraction membrane 22. More specifically, the annulus 24 is in the form of a jacket about the wall 14 of the housing 12. Preferably, the annulus forms a hollow cavity 0.03 to 0.2 inches in thickness, about the housing outside wall 14 and the inner surface of the outside wall 28. The annulus 24 includes an inlet 30 for the entry of the mixed gas flow there into and a communicating portal 32, the mixed gas flow exiting the portal is contacted with the extraction membrane 22. A passageway 36 is provided for removal of the extracted constituent gas.

Preferably, the mixed gas flow inlet 30 and portal 32, into and out of the annulus 24, respectively, are on opposite sides and opposite ends of the housing 12. In this manner, mixed gas flow entering through the inlet 30 flows circuitously about, around and effectively jackets the housing wall 14 prior to exiting from the annulus through the portal 32 and contacting an extraction tube 22. In this manner, the housing wall 14 is simultaneously insulated by the jacketing gas within the annulus 24 while the mixed gas flow within the annulus 24 is preheated prior to entering the extraction membrane 22. Thus, the flow through the annulus 24 serves to preheat the incoming mixed gas flow with heat that would be lost in the environment and/or would go out with the purified hydrogen via the passageway 36. Thus, configured, annulus 24 serves to preheat the mixed gas flow while conserving energy within the system. A particularly effective form of this annulus in shown is FIG. 5, where the annulus 24"" is extended and set opposite a second annulus 50 in which flows the exiting purified constituent gas. These two annuli serve as a form of curved 'flat-plate' heat exchanger, greatly improving the thermal behavior of the system.

The assembly 10 optionally includes a flow restricting means for controlling raffinate mixed gas flow out of the housing 12. The flow restricting means is preferably in the form of a flow restricting frit or check valve disposed proximate to or within the outlet channel 34 of the gas extracting membrane 22. An example of such a flow restricting frit is a porous metal flow restrictor (Mott Metallurgical Corporation, Connecticut, USA). The flow restrictor 38 provides a measure of internal raffinate flow control, improving safety, making small units simpler to build and larger units easier to operate. Optionally, a flow restrictor is adopted to fit within the passageway 36 to prevent backflow into the housing 12.

One of these safety features is serving as a flame arrester so that a fire in the raffinate cannot burn back into the purifier membrane 22 and also so that fire in the purifier membrane 22 cannot shoot out of the gas discharge outlet 34. A second safety feature, operative in the case of a hot start up or sudden shut down, the flow restrictor 38 prevents the sudden contact of explosive mixture with a hot extraction membrane 22. It is appreciated in those aspects of the instant invention having multiple gas extraction membranes contained within a single housing that an added measure of control and therefore safety is attained by butting each such membrane with a separate frit or check valve to each membrane or butting each separate membrane to an exhaust tube that contains a frit or valve therein. Such an exhaust tube entering an outlet channel by way of a manifold or each such exhaust tube leading to the exterior of the apparatus housing.

A system 10', in FIG. 2, is shown to include fluid conducting means in the form of conduit 40 for conducting raffinate mixed gas flow from the gas extraction membrane 22' to the heating chamber 20'. The heating chamber 20' contains a catalyst, shown schematically at 42, which promotes an exothermic reaction (e.g., burning) of the raffinate mixed gas flow to generate heat within the heating chamber 20'.

With specific regard to the mixed gas flow containing hydrogen, the catalyst 42 can be selected from the group consisting of mixed oxides of palladium, platinum, and rhodium. A catalyst from this group combines oxygen from the air with hydrogen and other combustible gasses in the raffinate flow to generate heat.

Further, the housing 12' includes a vent 46 or feed tube 47 (FIG. 5) in fluid communication between the heating chamber 20' and an exterior of the housing 12' for allowing fluid flow of air into the heating chamber 20' for reacting with the raffinate bleed on the catalyst 42 to generate heat within the heating chamber 20 20'. Heat is generated within the heating chamber 20' when it is filled with the appropriate catalyst 42 and is presented with the raffinate bleed via the conduit 40 and the outlet channel 34', the raffinate containing hydrogen plus impurities, and with air that counter diffuses in through the top vent 46 or which enters under pressure through the feed tube 47. Thus, the heating chamber 20' is heated with a limited requirement of any external energy being expended possibly for start-up and temperature control.

The vent 46 is in the form of a mesh or a tube which keeps the catalyst 42 in place, and allows reaction products e.g., water and carbon dioxide to leave the heating chamber 20'. Alternatively, a controllable mechanism monitors and controls the amount of oxygen entering the heating chamber 20'. Such an active control vent is regulated by a thermal, pressure or like feed back mechanism.

The above described heating method is most appropriate for use with 60% to 90% hydrogen mixed gas flow sources. Examples of such sources are petrochemical fuel-gas streams, and the products of methanol, ethanol, or petroleum-water reforming. A flow restrictor 38 is preferred in combination with the system of the instant invention. Without such a restrictor 38, careful control of the raffinate flow is required, else a flame may shoot out of the catalytic combustor (the heating chamber 20'). Further, a restrictor can prevent very hot air from being drawn back into the device when the flow is turned off. This drawn back air may lead to an explosion. Hence, the addition of the restrictor 38 in combination with the recycling raffinate/catalyst heating mechanism of the instant invention provides a safe and efficient heating system.

In the invention as shown in FIG. 1, a mixed gas flow enters the annulus 24 through the inlet 30 and effectively jackets the housing wall 14 thereby insulating the housing 12. Simultaneously, the mixed gas flow within the annulus 24 is preheated prior to entering the core of the gas extraction membrane 22. The mixed gas flow enters the gas extraction membrane portal 32 and hydrogen gas is extracted from the mixed gas flow and exits through passageway 36. The raffinate mixed gas flow exits the extraction tube 22 through outlet channel 34, the flow of which is controlled by the restrictor 38. As shown in FIG. 2, the mixed gas flow circulates through the conduit 40 into the heating chamber 20' so as to react with ambient air entering through the passageway 46 so as to react on the catalyst 42 to generate heat.

Thus, the present invention further provides a method for purifying gas at high temperatures by heating the mixed gas flow within the housing 12 and making an extraction from the gas. The method further includes the steps of insulating the housing 12 by circulating the mixed gas flow about the housing 12 and injecting the mixed gas flow into the housing. By injecting, it is meant that the pressure head of the mixed gas flow entering the annulus 24 forces the mixed gas flow through the portal 32 into the extraction membranes 22.

The instant invention optionally further includes the steps of conducting the raffinate mixed gas flow from the housing 12' to the heating chamber 20' and reacting the mixed gas flow on the catalyst 42 within the heating chamber 20' to generate heat within the heating chamber 20'.

This step involves the entrance of raffinate via conduit 40, the entrance of a second reactant, e.g., air by vent 46 (FIG. 2) or an inlet tube into the heating chamber 20' for reacting on the catalyst 42 to generate heat into the heating chamber and the venting of products via 46. An electric heater, 100 is optionally provided for start up of the system of the instant invention (FIG. 5).

The annulus 24 of the present invention is a more effective insulating layer than a stagnate gas because the continuous flow provides feed heating that would otherwise have to be provided by some other heating source. In the end, this improves temperature uniformity and reduces the heat loss to the environment. For a proper choice of annulus size, the annulus combined with a thermal insulating blanket is more effective at conserving heat than a thermal blanket alone. The flow through this layer preheats the incoming gas with heat that would be lost in the environment and/or would be carried away with pure hydrogen.

Figure 3:
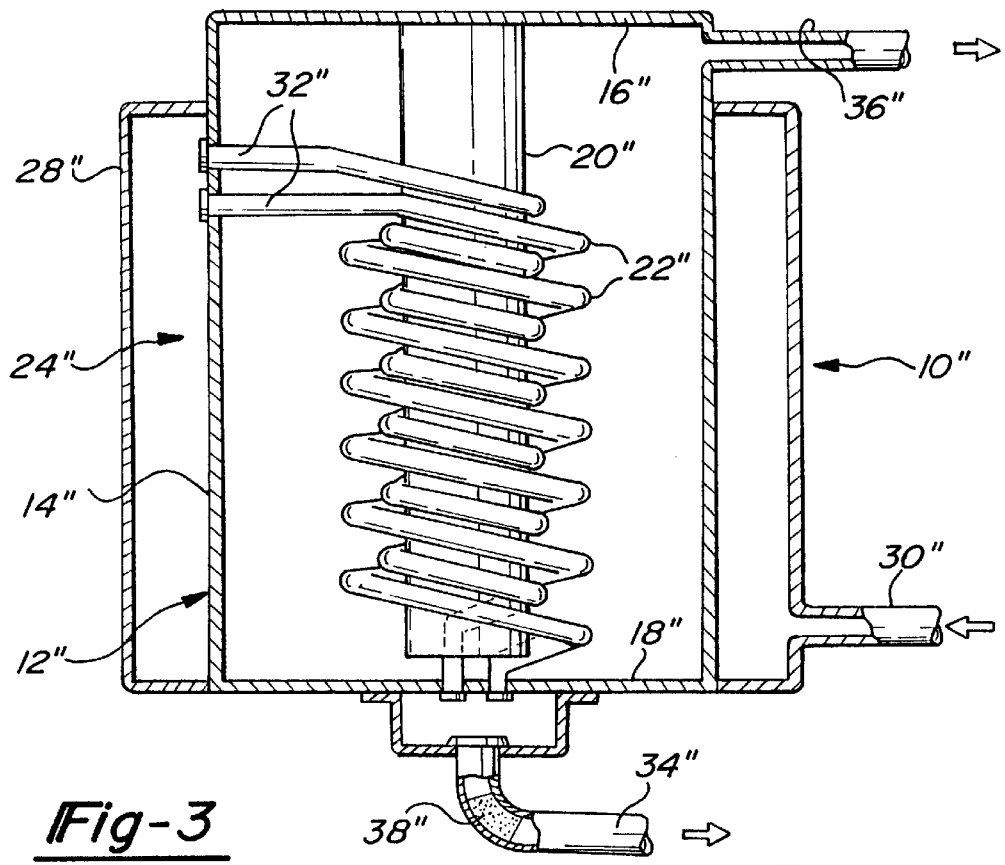
FIG. 3 is a cross sectional view of a third embodiment of a gas purification system constructed in accordance with the present invention.

FIG. 3 shows two spiral tubes 22" functionally in combination. Again, double primed numerals are used to indicate like structure between the several illustrative figures. FIG. 3 illustrates the use of multiple tubes, the number of the tubes depending upon factors including the interior space of the housing 12". The increase in tube number increases throughput. Thusly, a predetermined size housing 12" can include multiple gas extraction membranes and thereby increase productivity and effectively decrease costs. It is further appreciated that each of multiple tube arrangement is optionally configured with an individual flow restrictor for each tube (not shown).

Figure 4:
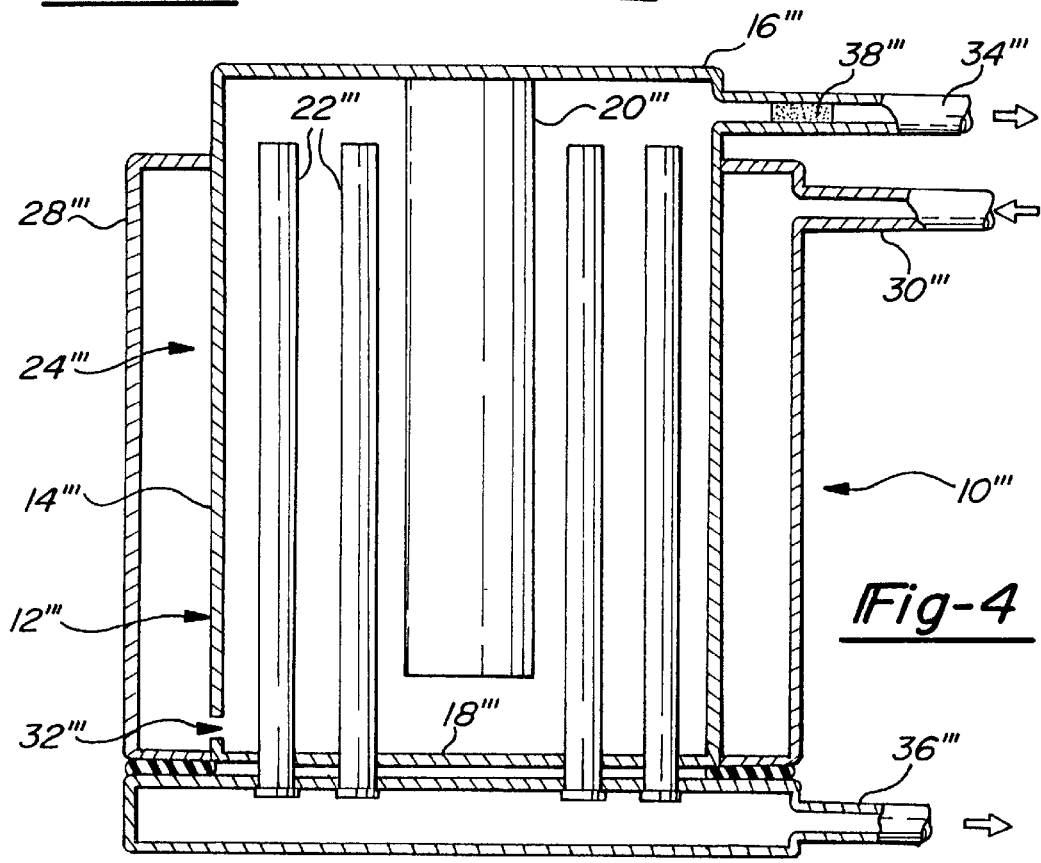
FIG. 4 is a cross sectional view of a fourth embodiment of the present invention which includes flat sheet membranes.

In FIG. 4 like structures between the several embodiments are shown as triple primed numerals. In FIG. 4, the present invention is shown to include an annulus 24''', and a flow restrictor 38''' in combination with multiple straight gas extraction tubes 22'''. Such an embodiment has numerous applications for the extraction of constituent gases other than hydrogen. Certain ceramic membranes cannot be coiled but are nonetheless operative as extraction membranes in the present invention. Hence, the flexibility of the present invention is demonstrated in the application of gas extraction membranes other than spiral metal membranes. Likewise, the embodiment of the present invention of FIG. 4 is operative with the fluid conducting means discussed above for conducting raffinate mixed gas flow from the gas extraction tubes to the heating chamber of reaction catalysts to generate heat within the heating chamber.

The elevated temperature of operation and the pressure gradients associated with gas membrane extraction may induce deformation of the membrane 22". In embodiments of the instant invention, such as that depicted in FIG. 4, where a mixed gas flow is simultaneously in contact with the interior of the housing 12 and a membrane 22''', there is a likelihood of membrane collapse, owing to the mixed gas flow pressure exerted on a membrane. To prevent such deformation a coiled support is optionally inserted within a membrane (not shown). The coil support preferably has a pitch of less than about 30°, larger pitch angles do not provide adequate stiffening properties. More preferably, the pitch angle is between 3° and 25°. The coiled support is constructed of a material having a higher rigidity and tensile strength than the membrane in operation. Furthermore, the support is not reactive towards a constituent gas, under operation temperatures of the instant invention. For extraction of constituent gases other than hydrogen, membrane materials specific to the constituent gas are selected from these known to the art, either alone, or coated to increase gas extraction efficiency.

In FIG. 5, the present invention is shown with an annulus 24"" that is extended to enhance recovery from the extracted constituent gas as it flows through a second annulus 50. In FIG. 5, four primed numerals indicate like structure between the several figures. Further, included is a reforming catalyst, 44. The reforming catalyst allows the module to accept organic feeds directly. For example, a mixed flow of methanol and water or of ethanol and water illustratively serves as feed stock. The mixture is heated in the annulus, vaporized, and contacts the catalyst, 44, thereby generating hydrogen.

The hydrogen is then purified through the membranes 22"" and collected at 36"". The raffinate is then combusted at 20"". Preferably, the raffinate is combusted on the combustion catalyst 42"", providing the heat to maintain the reaction. In FIG. 5, a membrane reactor 10"" is built with flow restrictor 38"" and annulus 24"" for generating hydrogen, preferably from an alcohol and water mixture or from a gasoline and steam mixture. A methanol (or other) reforming catalyst 44 is disposed within the housing 12"" and adjacent to the extraction tubes 22"". Hydrogen is formed e.g., by the reaction $MeOH+H_2O \rightarrow 3H_2+CO$. Much of the hydrogen is collected at the annulus 50, where it is cooled and fed to the exit passageway 36"", the remainder is vented to combustion within the heating chamber 20"" along with non-reacted components CO, $CO_2$, alcohol and $H_2O$. Hence, this system includes two different catalysts. A first catalyst is the methanol reforming catalyst 44 for generating hydrogen from methanol and water. Ideally, this first catalyst also operates as a water-gas shifter catalyzing the reaction $CO+H_2O \rightarrow CO_2+H_2$. A second catalyst is contained within the heating chamber 20"", as discussed in detail above, for generating heat within the chamber.

The invention has been described in an illustrative manner, and it is to be understood that the terminology which has been used is intended to be in the nature of words of description rather than of limitation. Modifications and variations of the present invention are possible in light of the above teachings. It is, therefore, to be understood that within the scope of the appended claims the invention may be practiced otherwise than as specifically described.

What is claimed is:

1. A method for separating a gas at high temperature from a mixed gas flow comprising the steps of:
   introducing a mixed gas flow into a housing containing a heating chamber therein;
   contacting the mixed gas flow with a selectively gas permeable membrane;
   allowing sufficient contact time between said membrane and the mixed gas flow for a constituent gas of the mixed gas flow to selectively pass said membrane so as to leave a raffinate deficient in the constituent gas in contact with said membrane;
   conducting said raffinate into said heating chamber by means of a conduit;
   reacting said raffinate exothermically in the presence of a catalyst so as to heat said housing, said membrane therein, and to produce byproducts;
   venting said byproducts from said heating chamber; and
   collecting the constituent gas.

2. The method of claim 1 further comprising the steps of:
   introducing a feedstock into a hollow cavity, said cavity containing a second catalyst suitable for converting the feedstock into the mixed gas flow containing the constituent gas prior to introducing the mixed gas flow, said cavity, being disposed about said housing.

3. The method of claim 1 further comprising the steps of:
   introducing the mixed gas flow into a hollow cavity, said cavity disposed about said housing so as to preheat the mixed gas flow prior to introducing the mixed gas flow into said housing.

4. The method of claim 1 wherein the conduit contains a flow restricting means.

5. A high temperature gas purification system comprising:
   a housing having an interior and an exterior, and a communicating portal therebetween for a mixed gas flow;
   an annulus having an inner wall and an outer wall, said annulus disposed adjacent to the exterior of said housing, thereby forming a hollow internal cavity adjacent to the exterior of said housing;
   an inlet for directing mixed gas flow into said hollow cavity and towards the portal of said housing;
   a gas extraction means within the interior of said housing, said gas extraction means in contact with the mixed gas flow from said inlet wherein said gas extraction means is capable of selectively passing a constituent gas of the mixed gas flow therethrough, whereby a raffinate of the mixed gas flow is retained in contact with said gas extraction means;
   a gas heating means wherein said gas heating means is in thermal contact with said mixed gas flow;
   an outlet channel for removing said raffinate from contact with said gas extraction means; and
   a passageway for the removal of the constituent gas from the interior of said housing.

6. The gas purification system of claim 5 wherein said inlet for mixed gas flow is in a nonlinear alignment with the portal, such that the mixed gas flow follows an indirect route through said hollow cavity before exiting the communicating portal.

7. The gas purification system of claim 5 wherein said outlet channel or passageway further comprises a flow restricting means for controlled release of said raffinate or constituent gas through said outlet channel or passageway, respectively.

8. The gas purification system of claim 7 wherein said flow restricting means is a porous metal flow restriction.

9. The gas purification system of claim 7 wherein said flow restricting means is a check valve adapted to allow uni-directional movement of said raffinate or constituent gas from contact with said gas extraction means.

10. The gas purification system of claim 5 wherein said gas extraction means is affixed to the portal such that the mixed gas flow entering through the portal is contained within said gas extraction means.

11. The gas purification system of claim 10 wherein said gas extraction means is a multiplicity of selectively permeable gas extraction tubes, each of said multiplicity of tubes abutting an exhaust tube, said exhaust tube in fluid communication with said channel.

12. The gas purification system of claim 11 wherein said exhaust tube contains therein a flow restricting means adapted to allow uni-directional movement of said raffinate from contact with said gas extraction means.

13. The gas purification system of claim 5 wherein said gas extraction means is a selectively permeable gas membrane.

14. The gas purification system of claim 13 wherein the mixed gas flow entering through the portal is simultaneously in contact with the interior of said housing and said membrane.

15. The gas purification system of claim 14 wherein said membrane is a tube, said tube containing therein a coiled spiral support, said support having an angular pitch of between 3° and 30°.

16. The gas purification system of claim 13 wherein said selectively permeable gas membrane is a tube consisting of a material permeable to the constituent gas selected from the group consisting of: refractory metals, alloys of refractory metals, polymers, palladium-silver, palladium-copper, porous metals, silica, and ceramics.

17. The gas purification system of claim 16 wherein said selectively permeable gas membrane is permeable to hydrogen and hydrogen is the constituent gas in the mixed gas flow.

18. A gas purification system of claim 5 wherein said heating means includes an electrically powered heating element.

19. The gas purification system of claim 5 further comprising a fluid conduit for conducting said raffinate from said outlet channel into said heating means, wherein said heating means is a heating chamber.

20. A gas purification system as set forth in claim 19 wherein said heating chamber contains an active catalyst, said catalyst promoting the exothermic reaction of said raffinate, so as to generate heat within said heating chamber.

21. The gas purification system as set forth in claim 20 wherein said active catalyst promotes the oxidation of said raffinate.

22. The gas purification system as set forth in claim 19 wherein said heating chamber further comprises a vent, said vent in fluid communication between said heating chamber and a source of air or oxygen so as to allow fluid flow of air or oxygen into said heating chamber.

23. The gas purification system of claim 5 wherein said passageway includes a second annulus disposed adjacent to the exterior of said housing such that said constituent gas within said passageway transfers heat to the first annulus surrounding the exterior of said housing.

24. The high temperature gas purification system of claim 5 wherein said housing contains a second catalyst adjacent to said gas extraction means so as to generate or consume the constituent gas.

25. An improved gas purification system for the removal of a constituent gas from a mixed gas flow, the system comprising: a portal for a mixed gas flow movement into a heated housing, said housing heated to a temperature between about 70° C. and about 700° C., said housing containing a gas extraction membrane capable of selectively passing the constituent gas; an outlet channel for removal of a raffinate derived from the mixed gas flow following the selective passing of the constituent gas therefrom, and a passageway for the removal of the constituent gas from said housing, wherein the improvement lies in:

a valve inserted adjacent to said outlet channel adapted to allow for uni-directional removal of raffinate and closure of said channel upon a raffinate pressure decreasing below a preselected threshold.

26. The improved gas purification system of claim 25 further comprising the improvement of:

an annulus surrounding said housing through which the mixed gas flow circulates so as to preheat the mixed gas flow prior to the mixed gas flow entering said housing.

27. The improved gas purification system of claim 25 further comprising the improvement of:

a second annulus in fluid communication with said passageway adjacent to said housing through which the constituent gas circulates so as to preheat the mixed gas flow prior to the mixed gas flow entering said housing.

28. An improved gas purification system for the removal of a constituent gas from a mixed gas flow, the system comprising:

a portal for mixed gas flow movement into a heated housing, said housing heated to a temperature between about 150° C. and about 700° C, said housing containing a gas extraction membrane capable of selectively passing the constituent gas; an outlet channel for removal of a raffinate derived from the mixed gas flow following the selective passing of the constituent gas therefrom, and a passageway for the removal of the constituent gas from said housing, wherein the improvement lies in:

a spiral support coil within said gas extraction membrane, wherein said membrane forms a cylindrical tube, said coil having an angular pitch of between 3° and 30°.

* * * * *

UNITED STATES PATENT AND TRADEMARK OFFICE
CERTIFICATE OF CORRECTION

PATENT NO. : 5,888,273

DATED : March 30, 1999

INVENTOR(S) : Robert E. Buxbaum

It is certified that error appears in the above-identified patent and that said Letters Patent is hereby corrected as shown below:

Column 1, line 28, delete "chamber," and insert --chamber.--.

Column 1, line 55, delete "as if" and insert --if--.

Column 1, line 58, after "unit" insert --that--.

Column 3, line 3, delete "similar," and insert --similar--.

Column 6, line 18, delete "of".

Signed and Sealed this

First Day of June, 1999

Attest:

Q. TODD DICKINSON

*Attesting Officer*

*Acting Commissioner of Patents and Trademarks*

UNITED STATES PATENT AND TRADEMARK OFFICE
CERTIFICATE OF CORRECTION

PATENT NO. : 5,888,273
DATED : March 30, 1999
INVENTOR(S) : Robert E. Buxbaum

It is certified that error appears in the above-indentified patent and that said Letters Patent is hereby corrected as shown below:

Column 4, line 62 - Delete "20" (first occurrence).
Column 4, line 57 - Move the paragraph that reads "Further, the housing 12' includes . . . " up one line to begin directly after the word "heat." on line 56.

Signed and Sealed this

Twenty-eighth Day of September, 1999

Attest:

Q. TODD DICKINSON

*Attesting Officer*　　　*Acting Commissioner of Patents and Trademarks*